United States Patent [19]
Palmers et al.

[11] Patent Number: 5,702,744
[45] Date of Patent: Dec. 30, 1997

[54] METHOD OF PRODUCING ALTAR BREAD

[76] Inventors: Bruce Palmers, 229 Locke Street, North, Hamilton, Ontario, Canada, L5P 4B8; Linda Thompson, P.O. Box 1046 Station "A", Hamilton, Ontario, Canada, L8N 3R4

[21] Appl. No.: 601,953

[22] Filed: Feb. 13, 1996

[30] Foreign Application Priority Data

Feb. 2, 1996 [CA] Canada ................................. 2168691

[51] Int. Cl.⁶ ............................................ A21D 13/00
[52] U.S. Cl. .......................... 426/242; 426/458; 426/523; 426/560
[58] Field of Search ............................ 426/244, 458, 426/464, 497, 506, 518, 523, 479, 560, 242

[56] References Cited

U.S. PATENT DOCUMENTS

| | | | |
|---|---|---|---|
| 2,942,562 | 6/1960 | Luc | 426/244 |
| 4,352,831 | 10/1982 | Cavanagh et al. | 426/497 |
| 4,621,997 | 11/1986 | Cavanagh | 425/299 |

*Primary Examiner*—George Yeung
*Attorney, Agent, or Firm*—Kilpatrick Stockton LLP; John M. Harrington

[57] ABSTRACT

A method of manufacturing a wafer comprises a series of steps. First, one proceeds with baking a mixture of flour and water to form sheets of bread. The sheets of bread are then thoroughly hydrated. The hydrated sheets are passed through a pair of roll cutters having complementary cutting surfaces, to cut a plurality of wafers, and a quantity of scrap. One then sorts the cut, hydrated wafers from the scrap by passing the wafers and scrap through a sorting drum to separate the wafers from the scrap. One then proceeds, arranging the wafers in a single horizontal layer on a surface that is substantially transparent to radiant heat, and exposes the single layer of wafers to radiant heat from above and below, to dry said wafers evenly and substantially without warping or bulging.

7 Claims, 2 Drawing Sheets

METHOD OF PRODUCING ALTAR BREAD

The present invention relates to the field of baking and processing wafer shaped bread products. In particular, the present invention provides a novel method and apparatus for the production of altar bread.

The production of altar bread, or communion hosts, for use in the celebration of the Mass, has been practised for centuries, and has been the traditional occupation of numerous orders of Holy Sisters. Altar bread has traditionally, and by necessity, been an additive free, unleavened bread, baked in a thin layer and cut or otherwise formed into a convenient size for its use in the celebration of the Mass. It is very desirable to produce a wafer that is not susceptible of crumbling about its perimeter, whereby to eliminate or at least reduce the incidence of crumbs forming in quantities of consecrated hosts.

Since a wafer is in fact composed of a relatively hard outer surface, and a relatively softer and more pliable inner mass, it will be understood that crumbs form because of the cracking and crumbling of the unsupported edges of the outer surfaces. It has been proposed, as a method of substantially reducing the incidence of crumbling of wafers to seal around the edges of the wafer, pressing the hard outside surfaces together, to provide the wafer with a stronger perimeter edge. This technique is shown in U.S. Pat. No. 4,621,997 (Cavanagh et al.) in which a production technique is described in which sheets of altar bread fresh from an oven are fed through a pair of forming rollers that are provided with die cavities to form sealed edge wafers by pressing the edges of the wafers together, from the top and bottom. It will be appreciated that to carry out this process, the bread must be soft and pliable, so the forming is carried out directly downstream of an oven. Alternatively, it is known to steam treat sheets of bread for use in the Cavanagh et al. process. As the individual wafers formed in the Cavanagh et al. process are formed, and cool and dry, they tended to bulge outwardly in their centres, becoming somewhat discus shaped. To prevent this, Cavanagh et al. provides, in each die cavity of the forming rolls, pseudo-decorative impression forming elements, the actual purpose of which is to mechanically bond the top and bottom surfaces together.

The Cavanagh et al. method and apparatus has provided a satisfactory product, but not without drawbacks. It is very inconvenient to locate a cutting and forming machine immediately downstream of an oven, so the aforementioned steam chamber technique is used, with a steam chamber put upstream of the cutting and forming rolls. This is not energy efficient, however. Steam is energy-expensive, and the steam chamber must be run substantially continuously when the cutting and forming machine is running.

Furthermore, a particular design may not be considered appropriate by all communities, especially if the prevailing choice in a particular community is for a plain, unadorned communion host.

The object of the present invention, therefore, is to provide a novel method and apparatus for the production of sealed edge altar bread wafers. A further object of the present invention is to provide such a method and apparatus that is economical and capable of producing a product of consistently high quality and of simple unadorned appearance.

In a broad aspect, then, the present invention relates to a method of manufacturing a wafer comprising the steps of: (i) baking sheets of substrate matter; (ii) hydrating said sheets of baked substrate; (iii) passing said hydrated sheets through a pair of roll cutters having complementary cutting surfaces, to cut a plurality of wafers, and a quantity of scrap; (iv) sorting said cut, hydrated wafers from said scrap by passing said wafers and scrap through a sorting drum to separate said wafers from said scrap; (v) arranging said wafers in a single horizontal layer on a surface that is substantially transparent to radiant heat; and (vi) exposing said single layer of wafers to radiant heat, from above and below, to dry said wafers evenly and substantially without warping or bulging.

In the drawings that illustrate the present invention by way of example:

Figure 1:
FIG. 1 is a schematic, flow diagram of the altar bread production method of the present invention.
Figure 2:
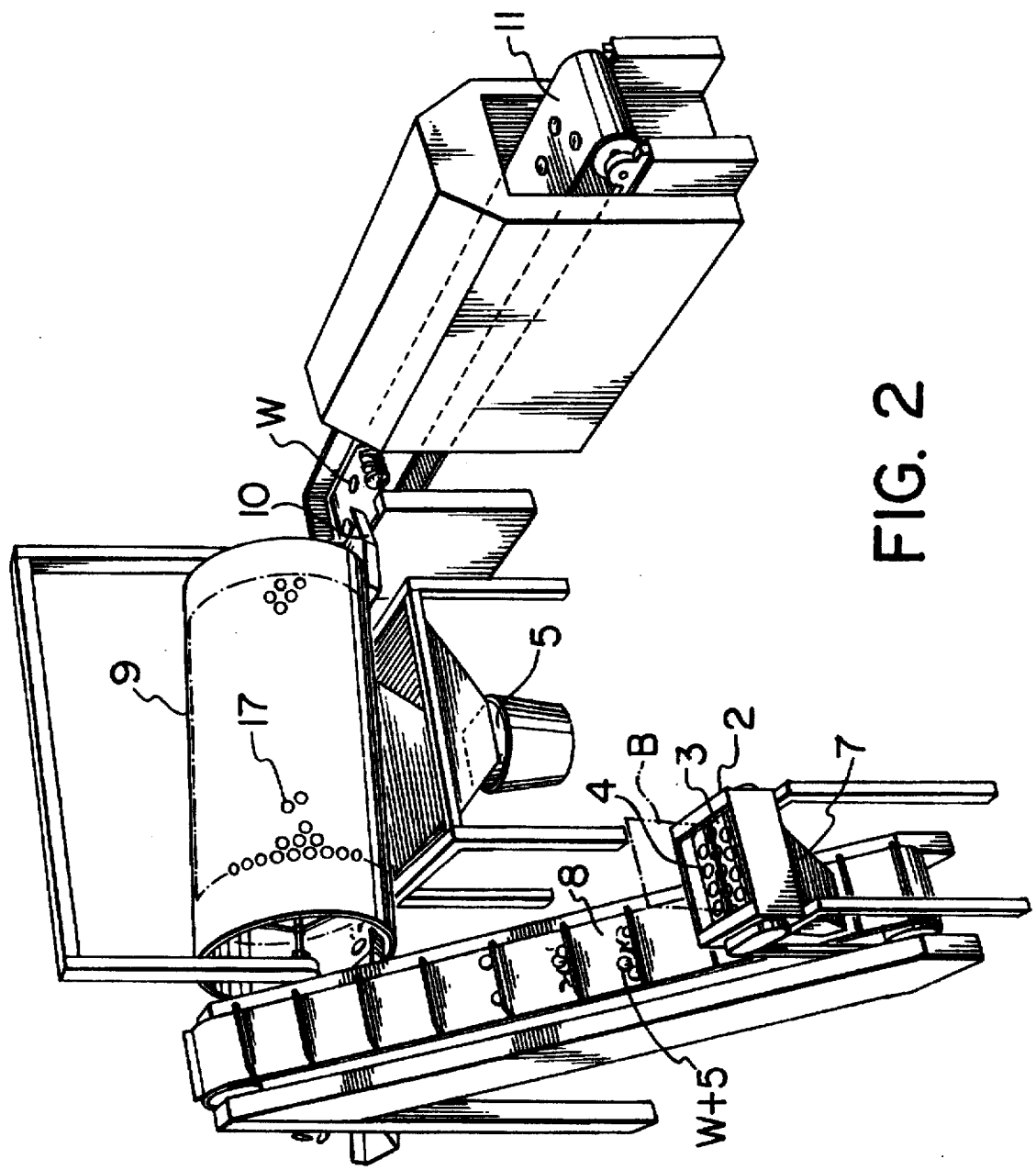
FIG. 2 is a perspective view of the wafer cutting, sorting and drying assembly of the present invention.

Referring now to FIGS. 1 and 2, it will be observed that the present invention comprises a five step process: baking, hydrating, cutting or forming, sorting, and drying.

The altar bread wafers of the present invention are baked utilizing a slurry of flour and water. The slurry is produced at a specific gravity or about Baume 1.14, and it is baked between heated plates to produce a very thin sheet of bread B, smooth and flat on both surfaces. Typically, a sheet will be about 25 cm wide, and 40 cm long, although sheet size will be a matter of choice.

After baking, the sheets, because of their thinness dry out and harden very quickly. Therefore, prior to any cutting of the sheets, they are thoroughly hydrated. This is done by stacking the baked sheets on trays (not illustrated, conventional bakers trays), and storing them in a hydrating chamber. The hydrating chamber is maintained in a relative humidity condition of at or near saturation by the atomization of water, and the circulation of the saturated air in the chamber by fans. The bread sheets are held in the chamber for about ten hours at a temperature of about 30° C.–35° C., after which they are cooled to about 16° C.–18° C., and held at that temperature for about two hours.

At the end of this period of time, the sheet will have obtained optimum mass density for cutting without surface cracking, but the sheets will not be so saturated that they will stick to the cutting and forming equipment, or simply fall apart.

The stacked trays of moisturized sheets of bread are then brought to the cutting, sorting and drying assembly illustrated in FIG. 2. An operator, after powering up the assembly, feeds the sheets of bread B one at a time, via a manual infeed chute (not illustrated, so as to illustrate cutter) into roll cutter 2, between the counter rotating rollers 3. As can be seen in FIG. 2, and in somewhat more detail in FIG. 4, the forming rollers 3 have on their surface a plurality of die cavities 4, each one of which is circular. The perimeter of each die cavity is defined by a cutting edge 5, that is at least about 0.015 inches wide. It is important that the cutting edges not simply be knife edges for at least two reasons. First, the cutting edges from the mated counter rotating forming rollers must meet each other, edge to edge and even in a precision machine This goal is difficult and expensive to accomplish and maintain with knife edges. Secondly, the pressure between the rollers must be quite high, to ensure a smooth cut is made around each wafer. At high pressures, a knife edge may crack.

Connecting the die cavities are scrap cutting edges similar to those known in the art, the function of which is to cut up the scrap S between the wafers W that are cut from bread B, with the maximum size of a piece of scrap being appreciably smaller than a wafer, to assist in sorting.

Figure 4:
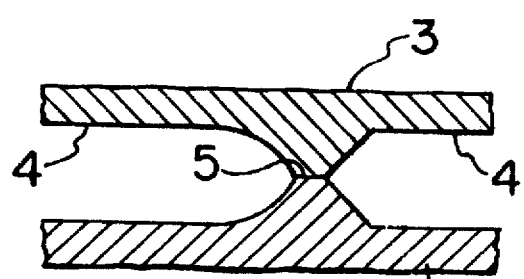
FIG. 4 is a cross-sectional view of a pair of aligned die cavities in the forming rolls of the assembly of FIG. 2.

Each die has a depth about one-half the depth of a wafer, to prevent the wafer from budging outwardly when it is cut. Moreover, the surface of the die, adjacent the cutting edge is at 6 bevelled at a shallow angle, or radiused, to provide support for the edge of the wafer at the instance of cutting, whereby crumbling is further resisted. Both a bevelled and a radiused cavity are shown in FIG. 4. It will be appreciated that for ease of production, and product consistency, all the cavities on a given roller will be similar.

After cutting, the wafers W and scrap S which together comprise the entire volume of bread B fall from the cutting rolls, through a chute 7, and onto a conveyor belt 8 which may as shown be compartmented, which permits a higher angle of travel, or it may be flat, depending on space consideration. The wafers travel via the conveyor to a sorting drum 9. It will be appreciated that, in an installation of appropriate lay-out and dimensions, the chute 7 may directly feed the drum 9, without the intervening conveyor.

The drum 9, which is angled slightly downwardly, is provided with a plurality of apertures 17 in its surface, (only a few of which are shown) each aperture being slightly smaller than a wafer W, but appreciably larger than the scrap S pieces. The drum is rotated by a motor means (not shown) the selection of which will be a matter of choice.

As the scrap S and wafers W tumble down the length of the rotating drum 9, the scrap S falls through the apertures, for disposal, and the wafers W exit the drum at the end of same, sliding down an angulated chute 10, onto a wire mesh conveyor 11.

Figure 3:
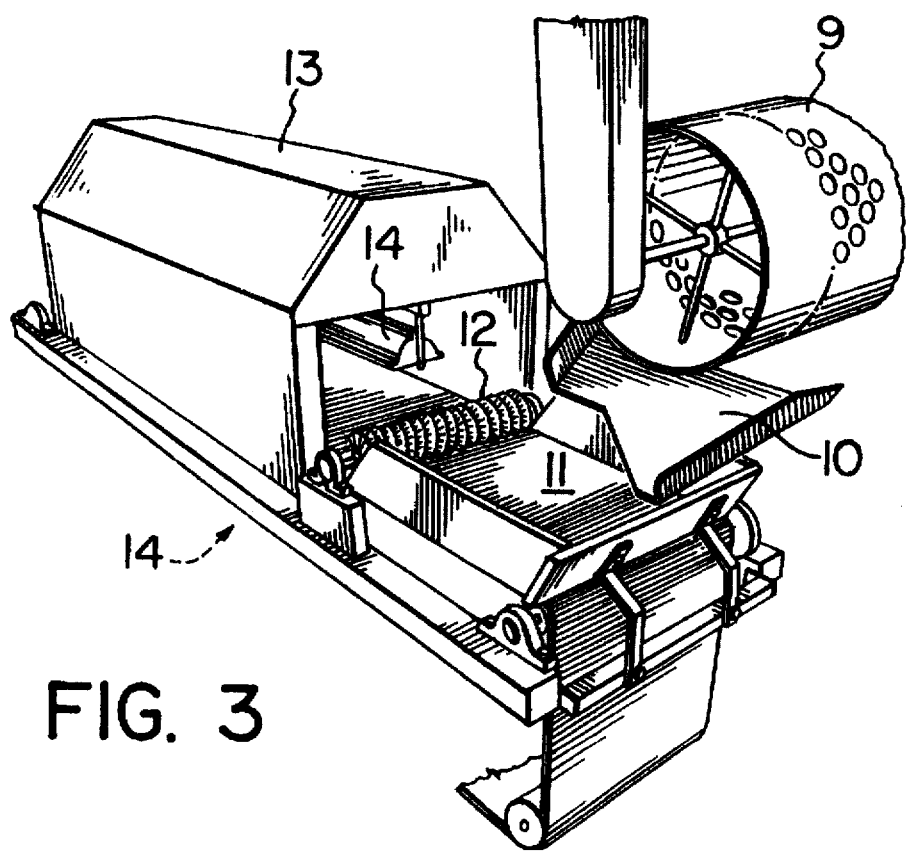
FIG. 3 is a detailed view of the entrance to the drying chamber in the assembly of FIG. 2.

The purpose of angulation of chute 10, as illustrated in FIG. 3, is to spread the wafers as evenly as possible across wire mesh conveyor 11. Wire mesh conveyor belt 11 travels away from the sorter drum 9, through a drying tunnel 13. Before entering the drying tunnel 13, however, the wire mesh conveyor 11 passes under a rotating sorting brush 12, the function of which is to ensure that wafers form a single layer on the wire mesh conveyor for even drying. To this end, the brush 12 rotates above the conveyor counter the direction of travel of the conveyor, with the edge of the brush bristles passing to within the thickness of a wafer from the wire mesh conveyor. As an alternative, or in addition to the rotating brush, the wire mesh conveyor may be vibrated before it reaches the tunnel 12, to achieve the same end.

The drying tunnel consists of a run of the wire mesh conveyor of sufficient length to permit the wafers to dry at an economical usage of energy, usually about three to five meters. The tunnel 13 is bounded above and below by radiant heaters 14, the selection of which will be a matter of choice. The function of the heaters is to dry out the wafers W by the time they exit from the drying tunnel. The wafers are dried from above and below to ensure even drying, without warping. Moreover, it is the need to dry from above and below that necessitates the use of a wire mesh conveyor, since such a conveyor is substantially transparent to radiant heat.

At the end of the drying tunnel, the wafers W are collected for inspection and packaging.

It is to be understood that the examples described above are not meant to limit the scope of the present invention. It is expected that numerous variants will be obvious to the person skilled in the field of altar bread baking and forming without any departure from the spirit of the invention. The appended claims, properly construed, form the only limitation upon the scope of the invention.

What is claimed is:

1. A method of manufacturing a wafer comprising the steps of:
   i) baking a mixture of flour and water to form sheets of bread;
   ii) hydrating said sheets of bread;
   iii) passing said hydrated sheets of bread through a pair of roll cutters having complementary cutting surfaces, to cut a plurality of wafers, and a quantity of scrap;
   iv) sorting said cut, hydrated wafers from said scrap by passing said wafers and scrap through a sorting drum to separate said wafers from said scrap;
   v) arranging said wafers in a single horizontal layer on a surface that is substantially transparent to radiant heat; and
   vi) exposing said single layer of wafers to radiant heat, from above and below, to dry said wafers evenly and substantially without warping or bulging.

2. A method as claimed in claim 1, wherein said bread is unleavened bread suitable for the production of altar bread wafers or hosts.

3. A method as claimed in claim 2, wherein said roll cutters are provided with mutually aligned cavities for forming wafers, each cavity having an inner surface recessed about one-half the depth of a wafer from the outer surface of the roll cutter, and an outer edge defining a wafer cutting surface at least 0.015 inch wide.

4. A method as claimed in claim 3, wherein between said inner surface and outer edge of each said cavity, the surface of said roll cutter is radiused or bevelled to provide a smooth transition between said inner surface and said outer edge.

5. A method as claimed in claim 4, wherein said wafers are sorted into said single layer on a moving conveyor by means of a counter rotating brush spaced from said conveyor by about the thickness of said wafer.

6. A method as claimed in claim 5, wherein said wafers are dried by means of radiant heating units positioned above and below said moving conveyor, which is made from steel mesh.

7. A method as claimed in claim 2, wherein said hydrating step includes the two substeps of:
   a) holding said baked sheets in a moisture saturated environment for 6–12 hours at about 30° C.–35° C.; and
   b) then cooling said sheets, in said saturated atmosphere to about 16° C.–18° C. for about two hours.

* * * * *